(12) United States Patent
Hurst et al.

(10) Patent No.: US 11,533,399 B1
(45) Date of Patent: Dec. 20, 2022

(54) GLOBAL BRIDGE OUT DIAL

(71) Applicant: West Corporation, Omaha, NE (US)

(72) Inventors: Marcus H. Hurst, Fremont, NE (US); William F. Krasso, Valley, NE (US); Srinivas X. Maganti, Patamata (IN)

(73) Assignee: INTRADO CORPORATION, Omaha, NE (US)

( * ) Notice: Subject to any disclaimer, the term of this patent is extended or adjusted under 35 U.S.C. 154(b) by 193 days.

(21) Appl. No.: 16/047,756

(22) Filed: Jul. 27, 2018

(51) Int. Cl.
*H04M 3/56* (2006.01)
(52) U.S. Cl.
CPC ..................... *H04M 3/56* (2013.01)
(58) Field of Classification Search
USPC .............. 379/202.01; 709/204, 227
See application file for complete search history.

(56) References Cited

U.S. PATENT DOCUMENTS

| | | | | |
|---|---|---|---|---|
| 2011/0159878 A1* | 6/2011 | Bender | ............... | H04M 7/0057 455/445 |
| 2013/0163409 A1* | 6/2013 | Ellison | ............... | H04L 61/2007 370/221 |
| 2016/0182726 A1* | 6/2016 | Frey | ................. | H04M 3/56 379/202.01 |
| 2016/0212273 A1* | 7/2016 | Tsypnyatov | ........... | H04M 3/562 |

* cited by examiner

*Primary Examiner* — Quynh H Nguyen

(57) ABSTRACT

An example home bridge may perform receiving an out dial call from a user, parsing a call number to determine a country code, querying a bridge location database to determine a closest designated bridge to a country associated with the country code, providing to the designated bridge out dial data for the call, and lending the out dial call at the designated bridge.

14 Claims, 3 Drawing Sheets

GLOBAL BRIDGE OUT DIAL

BACKGROUND OF THE INVENTION

1. Field of the Invention

Methods and apparatuses consistent with the present application relate to long distance conference calls. More particularly, the present application relates to using a local designated bridge for hosting conference calls.

2. Description of the Related Art

In modern telephony, quality issues associated with dialing from the United States to an international location over carrier networks exist. The issues encountered are that most providers, to reduce cost, utilize the lowest cost carrier while the premier carriers charge exorbitant fees, which makes the dialing solutions cost prohibitive for most users. There is also a legal component dictating that international calls must remain where they originated. From a conference perspective, this means that these calls cannot be redirected via the carrier networks to an international location to setup the conference call. Therefore, it would be desired to have a method for getting the call to the international location so that the call may be started and ended in that location locally without using the carrier networks.

Accordingly, what is needed is an efficient and universal method for rerouting the calls to be dialed from an international location that is local to the destination of the call.

SUMMARY OF THE INVENTION

Exemplary embodiments of the present invention overcome the above disadvantages and other disadvantages not described above. The invention in exemplary embodiments may include a method for using a reverse out dial of the international call. This allows for another level of holding long distance conference calls.

According to one embodiment, a method for call out dial performs: receiving an out dial call from a user, parsing a call number to determine a country code, querying a bridge location database to determine a closest designated bridge to a country associated with the country code, providing to the designated bridge out dial data for the call, and lending the out dial call at the designated bridge.

Another example embodiment may provide a system that includes a processor and memory, wherein the processor is configured to perform one or more of the following: receive an out dial call from a user, parse a call number to determine a country code, query a bridge location database to determine a closest designated bridge to a country associated with the country code, provide to the designated bridge out dial data for the call, and lend the out dial call at the designated bridge.

A further example embodiment may provide a non-transitory computer readable medium comprising instructions, that when read by a processor, cause the processor to perform one or more of: receiving an out dial call from a user, parsing a call number to determine a country code, querying a bridge location database to determine a closest designated bridge to a country associated with the country code, providing to the designated bridge out dial data for the call, and lending the out dial call at the designated bridge.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION

Figure 1:
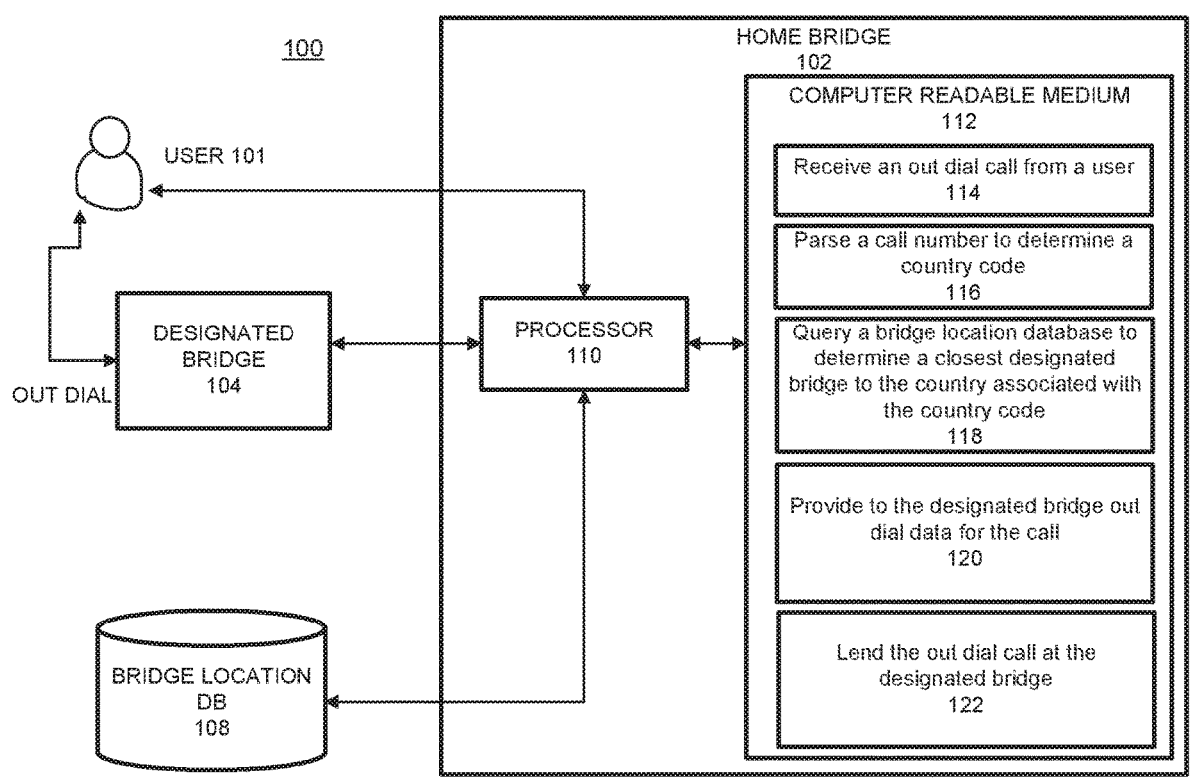
FIG. 1 illustrates a communication system 100, according to an exemplary embodiment.

Reference will now be made in detail to exemplary embodiments of the present invention, examples of which are illustrated in the accompanying drawings.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In one exemplary embodiment, a user may utilize a web application to join a meeting, which generates a dial out to the user's phone number on record or to a number inputted by the user. When the users select to be joined to the meeting, this generates a message to the audio platform. The message may include the phone number to call the user(s) at and the conference code for the conference they are joining. The phone number, if an international call is to be made, may have the country code associated with the location. The home bridge application may use the country code to query a bridge location database to determine where the closest bridge to the country being called is located. The application may then send a new message to that identified bridge with the phone number and the pass code so that the identified bridge location can perform the dial out. When the caller(s) answers their phone they will be prompted to input the pass code and will be joined to a new created audio conference on that remote designated bridge. The home bridge will receive a message that a conference has been created on the remote designated bridge and will create a link between the two bridges so that the audio can be heard in both conferences.

According to one exemplary embodiment, the closest bridge may be determined by pre-defining the available bridges based upon existing datacenters in each region—e.g., Europe may have bridges in Gloucester, London or Frankfurt and in Asia the bridges may be in Singapore or Sydney. However, other locations may become available based on proliferation of the data centers. Each bridge may have a unique ID and that ID is used to determine the geographical region the bridge is located in. For example, US=200 range, Canada=300 range, Europe=400 range, and Asia=500 range. Each remote designated bridge may be associated with a geographical region based upon the number scheme listed above.

The information that is passed to the designated dialing bridge may include the country code and the phone number as well as the assigned home bridge. For example, Home=226 and the country code is 44=UK, and dialing bridge=454. Then, a participant being dialed to join a conference with phone number 447035405555 is a UK number so the home bridge 226 in Longmont Colo. sends phone number and conference code 111777 to bridge 454 in the London datacenter, which then dials the number, in this case locally, thereby eliminating the Trans-Atlantic call rates and providing better call quality. The data is sent from the application running on the home bridge 226 via Session Initiation Protocol (SIP) to the application running on the bridge 454, which receives the SIP Info Message and processes it. Accordingly, each time a participant dials a phone number it lands on a bridge where that phone number is assigned. In a dial-out case, the designated bridge may be calling the participant. That call would be initiated from the bridge associated with the owner's profile (e.g., example home bridge 226). This would be a call from Longmont, Colo. to London, England participant. This brings in the local carriers in Colorado, the US carriers, the Trans-Atlantic carriers, the European carriers, and the UK carriers, and the local London carriers. The solution provided by this application is sending the SIP info to bridge 454 and eliminates all carriers except for the local European carriers and local London carriers. The application running on the bridge 454 makes the out dial and lands the call locally. The application on bridge 454 then sends a SIP message to the home bridge that it has callers associated with the main conference on the home bridge 226. The home bridge 226 then sends a SIP invite to the remote bridge 454 to establish the link between the bridges.

In one embodiment, the callers profile and pass code may be generated upon request from a company based upon the list of users they provide that need global call accounts. The pass code may be randomly generated based on specific rules to ensure it is unique across all other bridge application pass codes. The caller is then assigned a Toll and/or Toll Free number pair that is configured to land on a specific bridge based on caller's geographical region.

FIG. 1 illustrates a communication system 100 according to an exemplary embodiment. The communication system 100 may include a home bridge 102. The home bridge 102 may access a bridge location database 108 to acquire information about a designated bridge located in a geographical region indicated by a country code received with the call from a user 101.

While this example shows only one home bridge 102, multiple bridges may be connected to the bridge location database 108 and may access multiple designated bridges 104. It should be understood that the home bridge 102 may include additional components and that some of the components described herein may be removed and/or modified without departing from a scope of the home bridge 102 disclosed herein. The home bridge 102 may be a computing device or a server computer, or the like, and may include a processor 110, which may be a semiconductor-based microprocessor, a central processing unit (CPU), an application specific integrated circuit (ASIC), a field-programmable gate array (FPGA), and/or another hardware device. Although a single processor 110 is depicted, it should be understood that the home bridge 102 may include multiple processors, multiple cores, or the like, without departing from a scope of the home bridge 102.

The home bridge 102 may also include a non-transitory computer readable medium 112 that may have stored thereon machine-readable instructions executable by the processor 110. Examples of the machine-readable instructions are shown as 114-122 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read Only Memory (EEPROM), a hard disk, an optical disc, or other type of storage device.

The processor 110 may fetch, decode, and execute the machine-readable instructions 114 to receive an out dial call from a user. The processor 110 may fetch, decode, and execute the machine-readable instructions 116 to parse a call number to determine a country code. The processor 110 may fetch, decode, and execute the machine-readable instructions 118 to query a bridge location database to determine a closest designated bridge to the country associated with the country code. The processor 110 may fetch, decode, and execute the machine-readable instructions 120 to send to the designated bridge out dial data for the call. The processor 110 may fetch, decode, and execute the machine-readable instructions 122 to lend the out dial call at the designated bridge.

Figure 2:
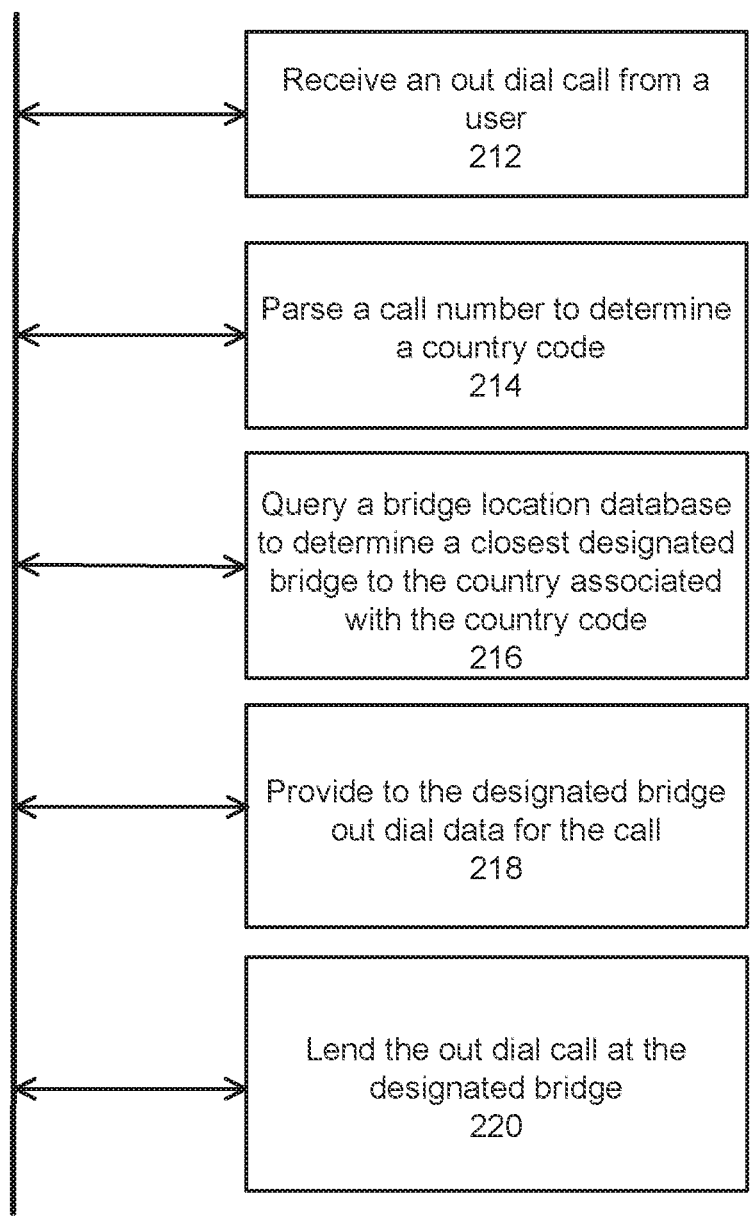
FIG. 2 is a flowchart of a method 200 for utilizing a designated local bridge at a long distance destination, according to an exemplary embodiment.

FIG. 2 illustrates a flow chart of an example method executed by the home bridge 102 (see FIG. 1) in accordance with one exemplary embodiment. It should be understood that method 200 depicted in FIG. 2 may include additional operations and that some of the operations described therein may be removed and/or modified without departing from the scope of the method 200. The description of the method 200 is made with reference to the features depicted in FIG. 1 for purposes of illustration. Particularly, the processor 110 of the home bridge 102 may execute some or all of the operations included in the method 200.

With reference to FIG. 2, at block 212, the processor 110 may receive an out dial call from a user. At block 214, the processor 110 may parse a call number to determine a country code. At block 216, the processor 110 may query a bridge location database to determine a closest designated bridge to a country associated with the country code. At block 218, the processor 110 may send to the designated bridge out dial data for the call. At block 220, the processor 110 may lend the out dial call at the designated bridge.

Figure 3:
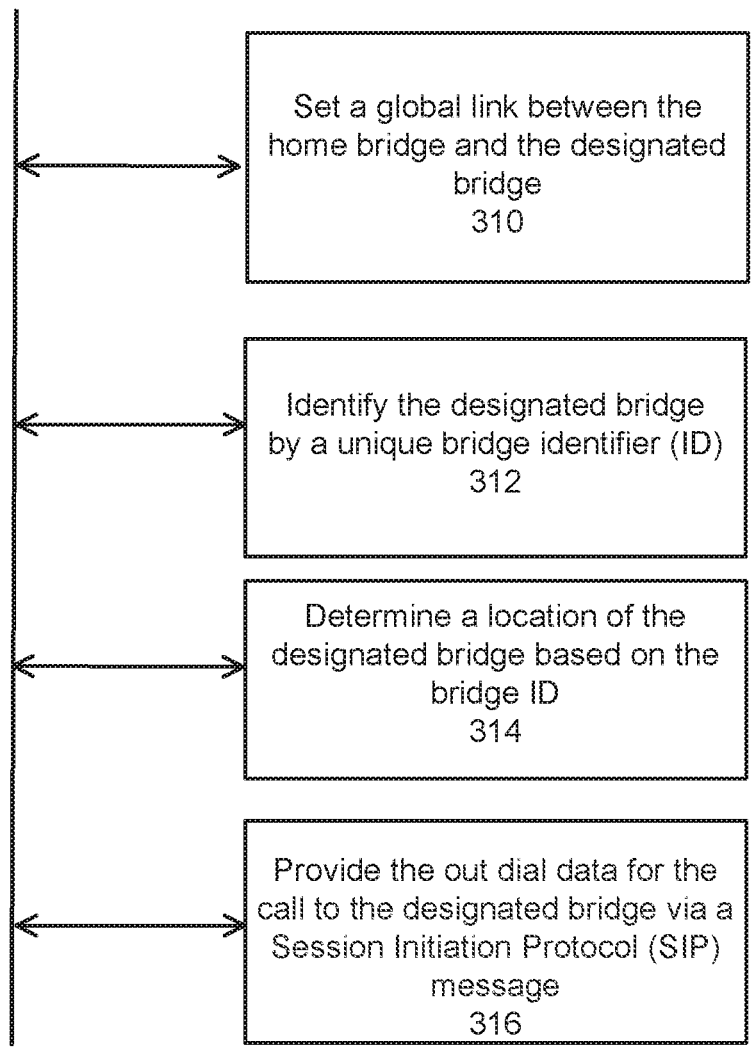
FIG. 3 is a flowchart of a method 300 for processing calls, according to an exemplary embodiment.

FIG. 3 illustrates a flow diagram 300 of an example method of processing a call, according to example embodiments. Referring to FIG. 3, the method 300 may include one or more of the steps described below.

FIG. 3 illustrates a flow chart of an example method executed by the home bridge 102 (see FIG. 1) in accordance with one exemplary embodiment. It should be understood that method 300 depicted in FIG. 3 may include additional operations and that some of the operations described therein may be removed and/or modified without departing from the scope of the method 300. The description of the method 300 is made with reference to the features depicted in FIG. 1 for purposes of illustration. Particularly, the processor 110 of the home bridge 102 may execute some or all of the operations included in the method 300.

With reference to FIG. 3, at block 310, the processor 110 may set a global link between the home bridge and the designated bridge. At block 312, the processor 110 may identify the designated bridge by a unique bridge identifier (ID). At block 314, the processor 110 may determine a location of the designated bridge based on the bridge ID. At block 316, the processor 110 may provide the out dial data for the call to the designated bridge via a Session Initiation Protocol (SIP) message.

Although a few exemplary embodiments of the present invention have been shown and described, the present invention is not limited to the described exemplary embodiments. Instead, it would be understood by those skilled in the art that changes may be made to these exemplary embodiments without departing from the principles and spirit of the invention, the scope of which is defined by the claims and their equivalents.

What is claimed is:

1. A method, comprising:
   receiving, by a home bridge, an out dial call from a user;
   parsing, by the home bridge, a call number of the out dial call to determine a country code associated with the out dial call;
   querying, by the home bridge, a bridge location database to determine a closest designated bridge to a country associated with the country code;
   sending, by the home bridge, a Session Initiation Protocol (SIP) message comprising out dial data for the call to the closest designated bridge, where the closest designated bridge dials the call number; and
   setting a global link between the home bridge and the closest designated bridge.

2. The method of claim 1, further comprising:
   identifying the closest designated bridge by a unique bridge identifier (ID).

3. The method according to claim 2, further comprising:
   determining a location of the closest designated bridge based on the bridge ID.

4. The method according to claim 1, wherein the out dial data comprises:
   a country code;
   a phone number;
   a conference code; and
   a home bridge identification.

5. The method according to claim 1, wherein the closest designated bridge dials the call number locally.

6. A home bridge, comprising:
   a memory storing one or more instructions; and
   a processor that when executing the one or more instructions is configured to:
   receive an out dial call from a user,
   parse a call number of the out dial call to determine a country code associated with the out dial call,
   query a bridge location database to determine a closest designated bridge to a country associated with the country code,
   send a Session Initiation Protocol (SIP) message comprising out dial data for the call to the closest designated bridge, where the closest designated bridge dials the call number, out dial data for the call, and
   set a global link between the home bridge and the closest designated bridge.

7. The home bridge according to claim 6, wherein the instructions are further to cause the processor to:
   identify the closest designated bridge by a unique bridge identifier (ID).

8. The home bridge according to claim 7, wherein the instructions are further to cause the processor to:
   determine a location of the closest designated bridge based on the bridge ID.

9. The home bridge according to claim 6, wherein the out dial data comprises:
   a country code;
   a phone number;
   a conference code; and
   a home bridge identification.

10. The home bridge according to claim 6, wherein the closest designated bridge dials the call number locally.

11. A non-transitory computer readable medium comprising one or more instructions that when executed by a processor of a home bridge cause the processor to perform:
    receiving an out dial call from a user;
    parsing a call number of the out dial call to determine a country code associated with the out dial call;
    querying a bridge location database to determine a closest designated bridge to a country associated with the country code;
    sending a Session Initiation Protocol (SIP) message comprising out dial data for the call to the closest designated bridge, where the closest designated bridge dials the call number; and
    setting a global link between the home bridge and the closest designated bridge.

12. The non-transitory computer readable medium of claim 11, wherein the instructions further cause the processor to:
    identify the closest designated bridge by a unique bridge identifier (ID).

13. The non-transitory computer readable medium of claim 12, wherein the instructions further cause the processor to:
    determine a location of the closest designated bridge based on the bridge ID.

14. The non-transitory computer readable medium of claim 11, wherein the closest designated bridge dials the call number locally.

* * * * *